Aug. 28, 1962     O. H. SCHELDORF     3,050,832
METHOD OF MANUFACTURING A MOTOR COMPRESSOR UNIT
Filed Feb. 18, 1960
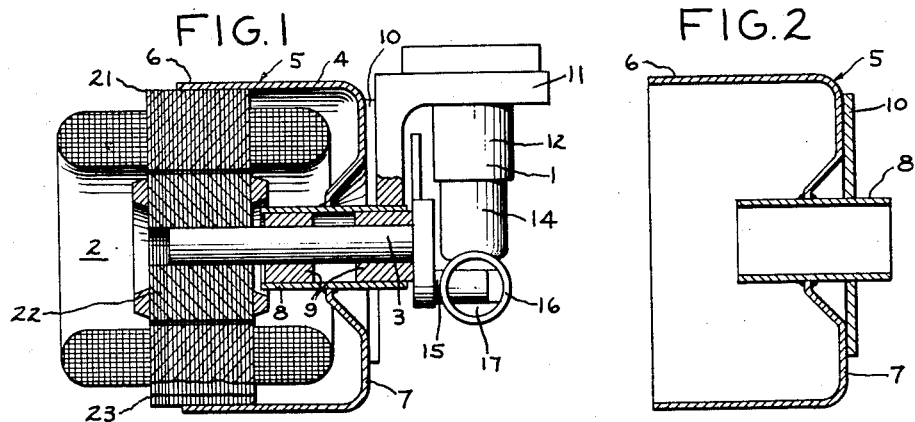
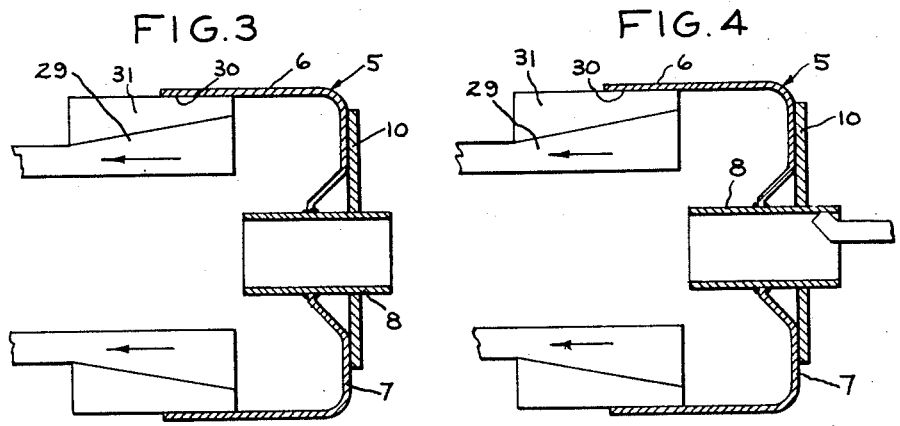
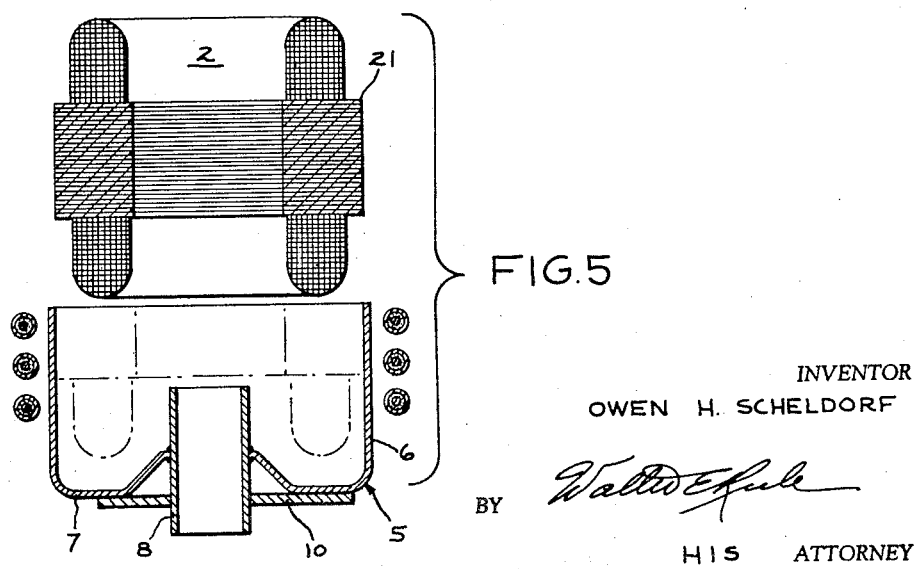
INVENTOR
OWEN H. SCHELDORF
BY *Walter E...*
HIS ATTORNEY

United States Patent Office 3,050,832
Patented Aug. 28, 1962

3,050,832
METHOD OF MANUFACTURING A MOTOR COMPRESSOR UNIT
Owen H. Scheldorf, Fern Creek, Ky., assignor to General Electric Company, a corporation of New York
Filed Feb. 18, 1960, Ser. No. 9,584
3 Claims. (Cl. 29—155.5)

The present invention relates to a motor-compressor unit and is particularly concerned with an improved low-cost method of manufacturing such units.

A number of motor compressor units of the type used in refrigeration industry comprise a compressor, a motor, a shaft connecting the motor rotor to the compressor and a single bearing positioned between the motor and the compressor for supporting the shaft. As the bearing which forms part of the motor frame positions the rotor relative to the stator, in order to provide the desired clearances between the stator and rotor components of the motor, it is necessary to accurately center the stator relative to the bearing surface.

In accordance with prior practices in which the stator has been welded, bolted, or similarly secured to the frame, this positioning of the stator has involved the use of accurate guage means for concentrically positioning the stator relative to the bearing surface during the welding operation or for accurately locating the bolt holes in the stator and stator frame relative to the bearing surface. In those prior practices in which the stator has been press or shrunk fit into the frame, the desired concentricity has been accomplished by accurately machining the interior surface of the frame contacting the stator concentric with the bearing surface. This process has been costly even when the two machining operations could be carried out simultaneously by rotating the frame relative to the cutting tools. The process has not been commercially adaptable to the mass production of motor-compressor units in which the frame is composed of a material such as a low carbon steel possessing relatively poor or limited machinability values. One reason for this is that, due to the differences in the diameters of the frame and bearing, the required cutting speeds for the bearing and frame are such that the two surfaces cannot be formed in a single machining operation.

The present invention is specifically concerned with the manufacture of motor compressor units in which the stator is held within the frame by an interference fit and has as its principal object, the elimination of the boring or machining of the inner surface of the stator frame heretofore used for accurate positioning of the stator relative to the bearing surface.

Another object of the invention is to provide a simplified and low-cost method of manufacturing motor compressor units including a drawn low carbon steel frame and by means of which the alignment of the stator and rotor can be accurately obtained.

Further objects and advantages of the invention will become apparent as the following description proceeds and the features of novelty which characterize the invention will be pointed out with particularity in the claims annexed to and forming a part of this specification.

In carrying out the objects of the present invention, there is provided a frame obtained by drawing a low carbon steel blank to form a cup including a cylindrical side wall for enclosing and supporting the stator element of the motor and a bottom wall for supporting the compressor component of the motor compressor unit. A single bearing extending through and connected to the bottom wall supports a shaft connecting the motor to the compressor. The required concentricity between the bearing and the cylindrical cup wall which supports the stator is obtained by expanding the stator supporting portion of the cylindrical cup wall by means of an expanding chuck to a diameter slightly greater than the outer diameter of the stator and, while by the cup is still held in the expanded state on the chuck, machining the inner surface of the sleeve concentric with the expanded cup by relative rotation of the cup and a cutting tool about an axis concentric with the axis of the expanded cup and chuck. The stator cup is then removed from the expanding chuck and heated by induction or flame heating to obtain sufficient thermal expansion to allow the stator to be positioned within the cup. Upon cooling, an interference fit is obtained between the stator and cup. As the relationship of the stator to the cup and the machined bearing surface is then the same as the relationship of the expanded chuck to the bearing surface during machining thereof, the same concentricity of the stator to the bearing surface and hence to the rotor carried on a shaft supported by the bearing surface is assured.

For a better understanding of the invention, reference may be had to the accompanying drawing in which:

FIG. 1 is a diagrammatic side elevation view, partly in section, of a motor-compressor unit constructed in accordance with the present invention;

FIG. 2 is a sectional view of the cup-shaped frame used in the practice of the present invention; and FIGS. 3, 4 and 5 respectively illustrate consecutive expanding, machining and assembly steps performed on the frame in the manufacture of the motor-compressor unit.

Referring to FIG. 1 of the drawing, there is shown somewhat diagrammatically a motor-compressor unit including an eccentric type compressor 1, a compressor drive motor 2 and a drive shaft 3 connecting the motor to the compressor. The major portion of the motor 2 is enclosed within a frame 4 which supports both the motor 2 and the compressor 1. This frame comprises a cup-shaped stator frame member 5 including a cylindrical wall 6 and a bottom wall or end 7. A bearing sleeve 8 in the form of a tube extends axially through the bottom wall 7 of the cup 6 and is secured to the cup 6 as by welding, the shaft 3 being supported within the bearing sleeve 8 by one or more bushings 9. An inverted L-shaped bracket 11 suitably secured, as by welding, to the bottom wall 7 of the cup 6 supports the compressor cylinder 12 on the cup. In addition to the cylinder 12, the compressor comprises a piston 14 connected to a crank pin 15 on shaft 3 through a yoke 16 and a cross slide 17.

The motor 2 comprises a cylindrical stator 21 held by a shrink or interference fit within the cup 6 and a rotor 22 mounted on the opposite end of the shaft 3 from the crank pin 15. The stator 21 consists of a plurality of annular laminations which are preferably held in substantial alignment by a plurality of spaced longitudinally extending line welds 23 as illustrated in FIG. 1 of the drawing. Since the stator is positioned by the cylindrical wall 6 of the cup member 5 while the position of the rotor carried by the shaft 3 is determined by the bearing sleeve 8, it will be seen that to obtain the desired uniform air gap between the rotor and stator, the interior surfaces of the cylindrical wall 6 of the cup 5 and the bearing sleeve 8 must be accurately maintained concentric with one another.

In accordance with the present invention, the cup 5 is composed of a low carbon steel, so that the cup is formed by drawing a steel blank into the general form or shape illustrated in the drawing, the drawing tools being designed so that the cylindrical wall 6 is of a diameter slightly less than the diameter of the stator 21. The bottom of the cup is then pierced and the tubular bearing sleeve 8 inserted and brazed or welded to the cup to provide a frame essentially as shown in FIG. 2 of the drawing. The plate 10 is welded or brazed to the cup and bearing for strengthening the assembly. The stator contacting portion of the cup is then expanded slightly beyond its yield point or elastic limit on a cylindrical expanding chuck having an expanded diameter slightly larger than the stator diameter. By using a precision chuck, the cup in its expanded condition, i.e. while still on the expanded chuck, possesses a dimensioned interior or stator contacting surface with reference to which the interior surface of the sleeve 8 can then be concentrically machined. Also by this expanding step, the cups, which have become work hardened nonuniformly during the drawing operation and which may also vary slightly in size due to material variations, are all expanded beyond their elastic limits so as to form true cylinders having uniform and controlled diameters and true and accurate center lines. This expanding step is diagrammatically illustrated in FIG. 3 of the drawing in which the numeral 29 indicates a cylindrical expanding chuck designed to engage the inner surface 30 of the cup 6 which will contact the stator 21, it being understood that the chuck 29 is composed of a plurality of segments 31 forming in the expanded state a true cylinder.

Because of the elastic deformation characteristics of the cup material, consideration must be given to the fact that after the expanding force exerted by the expansion chuck is released, the cup will shrink slightly. It is the difference between this shrunken dimension and the stator size that determines the amount of pressure which will be applied to the stator in the final assembly and since excessive pressure on stator laminations will affect the electrical characteristics of the laminations care should be exercised to assure a minimum interference of the cups following the expansion step.

Therefore the expansion chuck is designed to expand the cylindrical wall of the cup to an expanded diameter which is slightly greater than the diameter of the stator. However, the expanded diameter of the cup, that is, its diameter while still on the expanding chuck should not exceed the stator diameter by an amount greater than the shrinkage in diameter which will take place when the expanding force is removed. By working within these limits, the maximum load which will be placed on the stator laminations in the final assembly will always be less than that resulting from the elastic deformation of the cup and it has been found that such forces will not place a compressive load on the stator laminations of a value that might adversely affect the electric properties thereof.

With the cup mounted on the expanded chuck and held in the expanded state or condition, the cup having the precise configuration of the expanded chuck presents a true center line coinciding with the center line of the cylindrical chuck. This center line then provides an axis about which the chuck and cup is rotated for precision finishing of the inner surface of the bearing sleeve. By this step, the inner surface of the bearing sleeve is machined concentric with the expanded or stator seat portion of the cup. Upon removal of the cup from the expanding chuck, some distortion of the cup may occur. However this is not important since no processing of the cup or bearing sleeve is carried on at this point. Furthermore, since the cup has been expanded beyond its elastic limit this distortion is held at a minimum and is much less for example than the differences in shapes and diameters of the various cups following the drawing operation.

After the bearing surface is machined concentric with the expanded cup, the cup is removed from the chuck, and the stator seating portion of the cup is expanded thermally by means of induction or flame heating sufficiently to allow the stator to be positioned within the cup. Upon subsequent cooling of the cup, it shrinks into contact with the outer surface of the stator so that an interference fit between the interior surface of the cup and the stator is obtained. As the stator has in effect been substituted for the chuck, it will be obvious that the relationship of the stator to the cup is now similar to the relationship of the expanding chuck to the cup at the time that the inner surface of the bearing sleeve was being machined concentric with the chuck surface. Therefore, by this method, concentricity of the stator to the bearing sleeve is accomplished without the expense of grinding or machining the interior of the cup to concentricity with the tubular bearing sleeve in accordance with the prior practices.

Since the usual stator is relatively short as compared with its diameter, it may be difficult to accurately position the stator within the cup so that the stator axis and cup axis are in complete alignment, or in other words, coincide. For that reason there is preferably employed a stator construction in which the individual punchings or laminations are secured together in such a manner that they are capable of shifting relative to another to a slight extent during the interference fitting operation so that the laminations and total stator will conform to the interior surface of the cylindrical cup wall. The usual stator core formed of a plurality of thin punchings or laminations held together by longitudinally extending beads or lines of weld material spaced around their outer periphery is satisfactory for this purpose. While these beads of weld material serve to provide what for all practical purposes is a rigid stator assembly, the shrink fit pressure of the cup on the stator laminations joined together only at spaced points will cause the laminations to shift slightly relative to one another, that is, in the neighborhood of one or two thousandths of an inch for the total stator, whereby the laminations of a slightly off-line stator will become positioned coaxially about the center line of the bearing sleeve.

As a practical example of the manner in which the present invention is carried out, stator frames for a stator of a diameter of 4.790–4.7902 inches and length of 1.6 inches were manufactured by a method which included deep drawing blanks of carbon steel containing about 0.1 of a percent carbon into the form of cups having a diameter within the range of 4.760 to 4.765 inches. As the low carbon steel from which the cups were made had an elastic deformation such that after removal of a cup of these dimensions from the expanding chuck it decreased in diameter by .005 inch, the expanding chuck was designed to expand the cups to an expanded diameter of about 4.793 to 4.795 inches, that is to a diameter slightly greater than the diameter of the stator but not exceeding the diameter of the stator by more than the amount that the expanded cups would shrink after removal from the expanding chuck.

With the cup on the expanding chuck and held thereon in the expanded condition, the cup and chuck were rotated and the interior surface of the bearing sleeve machined in the conventional manner whereby the inner bearing sleeve surface was formed concentric with the expanded cup and chuck.

Upon removal of the cups from the expanding chuck, the elastic deformation of the low carbon steel which caused each cup to shrink about 0.005 inch in diameter resulted in cups having diameters which averaged about 2 mils less than the diameter of the stators. By heating the cups, they were expanded to a size to loosely receive the stators. The cups were then permitted to cool to a temperature of the stators whereupon the resultant interference fit securely united the stators to the cups. During the cooling step, the stator laminations will shift sufficiently to compensate for any slight misalignment between the stator and the cup during the assembly operation. Even though the laminations shift relative to one another, each remains concentric with the bearing surface due to its individual contact with the expanded surface of the cup. Hence the shifted laminations as a whole are also coaxial with the cup and hence with the interior cylindrical surface of the bearing sleeve. As the cup shrinks into engagement with the stator the cup tends to return to its diameter just prior to the heating step or in other words to a diameter slightly less than the diameter of the stator so that a compressive force is exerted by the shrunken cup on the stator laminations. By limiting the chuck expansion of the cup to a diameter which does not exceed the diameter of the stator by more than the elastic deformation of the cup as described hereinbefore, this pressure can be correspondingly limited and be held to the value which will not adversely affect the magnetic or electrical properties of the stator material.

While in accordance with the preferred practice of the invention, the cup and expanding chuck are rotated while the bearing surfacing tool remains stationary for the purpose of concentrically finishing the interior surface of the bearing sleeve, it is also possible to carry out this operation by rotating the finishing tool while holding the cup and chuck stationary, the accuracy of the tooling set up determining the accuracy of the concentricity of the bearing sleeve relative to the expanded cup.

From the foregoing it will be seen that there has been provided in accordance with the present invention an improved method of obtaining a bearing-stator alignment for air gap control between the stator and rotor. Not only does the method avoid the actual expense of machining the interior of the stator supporting cup for alignment purposes but it also avoids the mechanism and operational problems involved in attempting to machine the interior of the relatively large cup simultaneously with the interior of a small bearing sleeve.

While there has been shown and described a specific embodiment of the present invention, it is to be understood that the invention is not limited to the particular method shown and described and it is intended by the appended claims to cover all modifications within the true spirit and scope of the invention.

What I claim as new and desire to secure by Letters Patent of the United States is:

1. The method of manufacturing a motor-compressor unit including a motor stator which comprises:
   providing a frame including a stator-supporting cup having a cylindrical wall for engaging a stator and a bearing sleeve extending coaxially through and secured to the end of said cup;
   by means of an expanding chuck, expanding the cylindrical wall of said cup beyond the yield point thereof and to a diameter which is greater than the diameter of said stator but which does not exceed said stator diameter by an amount greater than the shrinkage in the diameter of said cylindrical wall taking place upon removal of the cup from said chuck;
   machining the inner surface of said sleeve concentric with the expanded cylindrical wall while said cup is held in the expanded state on said chuck by relative rotation of said cup and a cutting tool about an axis concentric with the axis of said expanded cylindrical wall;
   removing said cup from said chuck;
   heating said cup to cause said cylindrical wall to expand sufficiently to receive said stator;
   inserting said stator into said cup and cooling said cup to cause said cylindrical wall to shrink onto said stator thereby positioning said stator relative to said bearing sleeve.

2. The method of manufacturing a motor unit including a stator which comprises:
   providing a stator frame including a cup member having a cylindrical wall for engaging a stator and a bearing sleeve extending coaxially through and secured to the end of said cup;
   by mechanical means, expanding the cylindrical wall of said cup beyond the yield point thereof to form a cylinder having a diameter which is greater than the diameter of said stator by an amount less than the elastic deformation of said cylindrical wall;
   machining the inner surface of said sleeve concentric with the expanded cylindrical wall while said cup is held in the expanded state by rotating said cup relative to a cutting tool about an axis concentric with the axis of said expanded cylindrical wall;
   removing said cup from said mechanical expanding means; and
   thereafter heating said cup to cause said cylindrical wall to expand sufficiently to receive said stator, inserting said stator into said cup and cooling said cup to cause said cylindrical wall to shrink onto said stator thereby positioning said stator relative to said bearing sleeve.

3. The method of manufacturing a motor unit which comprises:
   providing a stator frame including a cup member having a cylindrical wall for engaging a cylindrical stator and a bearing sleeve extending coaxially through and secured to the end of said cup, said cylindrical wall having a diameter less than the diameter of said stator;
   by mechanical expanding means, expanding the cylindrical wall of said cup beyond the yield point thereof to form a cylinder of a diameter slightly greater than the diameter of said stator by an amount less than the shrinkage of said cup due to the elastic deformation thereof following removal of the mechanical expanding means;
   while said cup is still held in the expanded state, rotating said cup about the axis of said cylinder and machining the inner surface of said sleeve concentric with the expanded cylinder;
   removing said cup from said expanding means;
   heating said cup to cause said cylindrical wall to expand sufficiently to receive said cylindrical stator;
   inserting said stator coaxially within said cup and cooling said cup to cause said cylindrical wall to shrink onto said stator thereby coaxially positioning said stator relative to said bearing sleeve.

References Cited in the file of this patent
UNITED STATES PATENTS

| | | |
|---|---|---|
| 1,710,064 | Mummert | Apr. 23, 1929 |
| 2,752,669 | Carr | July 3, 1956 |
| 2,911,709 | Boynton | Nov. 10, 1959 |